(12) United States Patent
Miller

(10) Patent No.: US 6,602,124 B2
(45) Date of Patent: Aug. 5, 2003

(54) FISH HOLDER

(76) Inventor: Randall L. Miller, 1402 Redbud Cir., Plant City, FL (US) 33566

( * ) Notice: Subject to any disclaimer, the term of this patent is extended or adjusted under 35 U.S.C. 154(b) by 0 days.

(21) Appl. No.: 10/075,629

(22) Filed: Feb. 13, 2002

(65) Prior Publication Data

US 2002/0111128 A1 Aug. 15, 2002

Related U.S. Application Data

(60) Provisional application No. 60/268,512, filed on Feb. 13, 2001.

(51) Int. Cl.[7] .............................. A22B 1/00; A22B 5/06; A22B 7/00; A22B 15/00; A22B 18/00
(52) U.S. Cl. ....................................................... 452/185
(58) Field of Search ................................ 452/103, 185, 452/102, 105, 187

(56) References Cited

U.S. PATENT DOCUMENTS

| | | |
|---|---|---|
| 2,015,262 A | 9/1935 | Flagg et al. |
| 2,298,580 A | 10/1942 | Miron |
| 2,587,007 A | 2/1952 | Southward et al. |
| 2,603,829 A | 7/1952 | Siskoff |
| 2,785,436 A | 3/1957 | Noland et al. |
| 2,834,981 A | 5/1958 | Willis |
| 2,863,165 A | 12/1958 | Hartman |
| 2,891,275 A | 6/1959 | Schuls |

Primary Examiner—Charles T. Jordan
Assistant Examiner—Judith A. Nelson
(74) Attorney, Agent, or Firm—Geoffrey E. Dobbin

(57) ABSTRACT

A fish holder featuring a shortened handle section and teeth lining the entire length of the jaws of the holder is disclosed. The teeth in the jaws provide multiple points of contact against a fish, thereby enhancing control and grip on the fish. The disclosed invention may be constructed of two convex jaws or a combination of one convex jaw and one concave jaw. Teeth may also be arranged in a plurality of rows extending the length of the jaws. Use of the invention prevents contact with sharp body parts of the fish, such as teeth or spines.

19 Claims, 4 Drawing Sheets

FISH HOLDER

CROSS-REFERENCE TO RELATED APPLICATIONS

This Application claims priority based on earlier filed provisional application 60/268,512 filed on Feb. 13, 2001.

FIELD OF INVENTION

The present invention relates to a device used to hold fish in preparation for scaling and filleting. More specifically, the present invention relates to a dual-jawed tong and tongue structure, with teeth along the edges of each jaw of the tong, whereby the tongue is inserted into the mouth of a fish and the jaws grasp the fish. The multiple teeth along the entire length of the jaws provide multiple grip points on the fish and, therefore, a more secure hold. In so doing, a fisherman or chef never needs to directly handle the head of a caught fish while preparing it for cooking or storage. The present invention also provides a shorter handle section for greater control by the user.

BACKGROUND OF THE INVENTION

The use of fish holders of varying designs is known in the prior art. Fish holders are used in the process of cleaning and preparing fish for consumption or storage. Efficient holders provide numerous advantages over the use of hands alone. First, and foremost, a number of fish have sharp teeth and spines extending from their heads. Use of a holder keeps a fisherman's or chef's hands away from such sharp objects. Holders also make the process more efficient by stabilizing the fish, for easier cutting. For example, U.S. Pat. No. 2,015,262 to Flagg; U.S. Pat No. 2,298,580 to Miron; U.S. Pat. No. 2,587,007 to Southward, et al.; U.S. Pat. No. 2,603,829 to Siskoff; U.S. Pat. No. 2,785,436 to Noland, et al.; U.S. Pat No. 2,834,981 to Willis; U.S. Pat. No. 2,863,165 to Hartman; and, U.S. Pat No. 2,891,275 to Schuls are all illustrative of the prior art. Typically, fish holders according to the prior art have two jaws and a tongue.

While the aforementioned inventions accomplish their individual objectives, they do not teach a fish holder with teeth along the entire length of the jaw for added contact support. A number of the inventions teach teeth, but they are limited to a relatively single point of contact on the fish. Most have a handle structure of some type, but the handles are removed from the point of contact of the fish. The combination of removal of the handle and a single point of contact cause a loss of control in the handling of the fish. In this respect, the fish holder according to the present invention departs substantially from the usual designs in the prior art. In doing so, this invention provides a new and improved fish holder, utilizing tooth-lined jaws for greater hold and a shorter handle for greater control.

SUMMARY OF THE INVENTION

In view of the foregoing disadvantages inherent in the known types of fish holders, this invention provides an improved fish holder with lateral rows of teeth and a shorter handle. As such, the present invention's general purpose is to provide a new and improved fish holder that will provide greater hold and control over fish holders in the prior art. To attain this the fish holder according to the present invention is essentially composed of two jaws mounted on the top bar of a central "T" shaped support. The jaws are spring biased to the closed position and have handles that extend only far enough away from the "T" to allow for easy opening of the jaws. Teeth are positioned along the interior of the jaws and are designed to contact and pierce a fish's head when the holder is engaged with the fish. To use the present invention, a user opens the jaws by compressing the handles together and inserts the long bar of the "T" into the fish. The user then releases the handles, which then close the jaws on the fish's head in multiple locations. The user then holds the fish by grasping the handles. When finished with the process, the user simply opens the jaws again and releases the fish. The user's hand is positioned in almost the same place it would be if the user was scaling or filleting a fish without the holder. The familiarity and closeness provide greater control and make it easier for the user to learn to use the holder.

In the preferred embodiment, the "T" support is formed by joining two pieces, the long bar of the "T", or "tongue", and the short bar of the "T", or "axel", with the axel inserted through a transverse hole in the top of the tongue. Both jaws may then also be joined through the axel/tongue coupling and only one spring need be used to bias the jaws in a closed position.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

Figure 1:
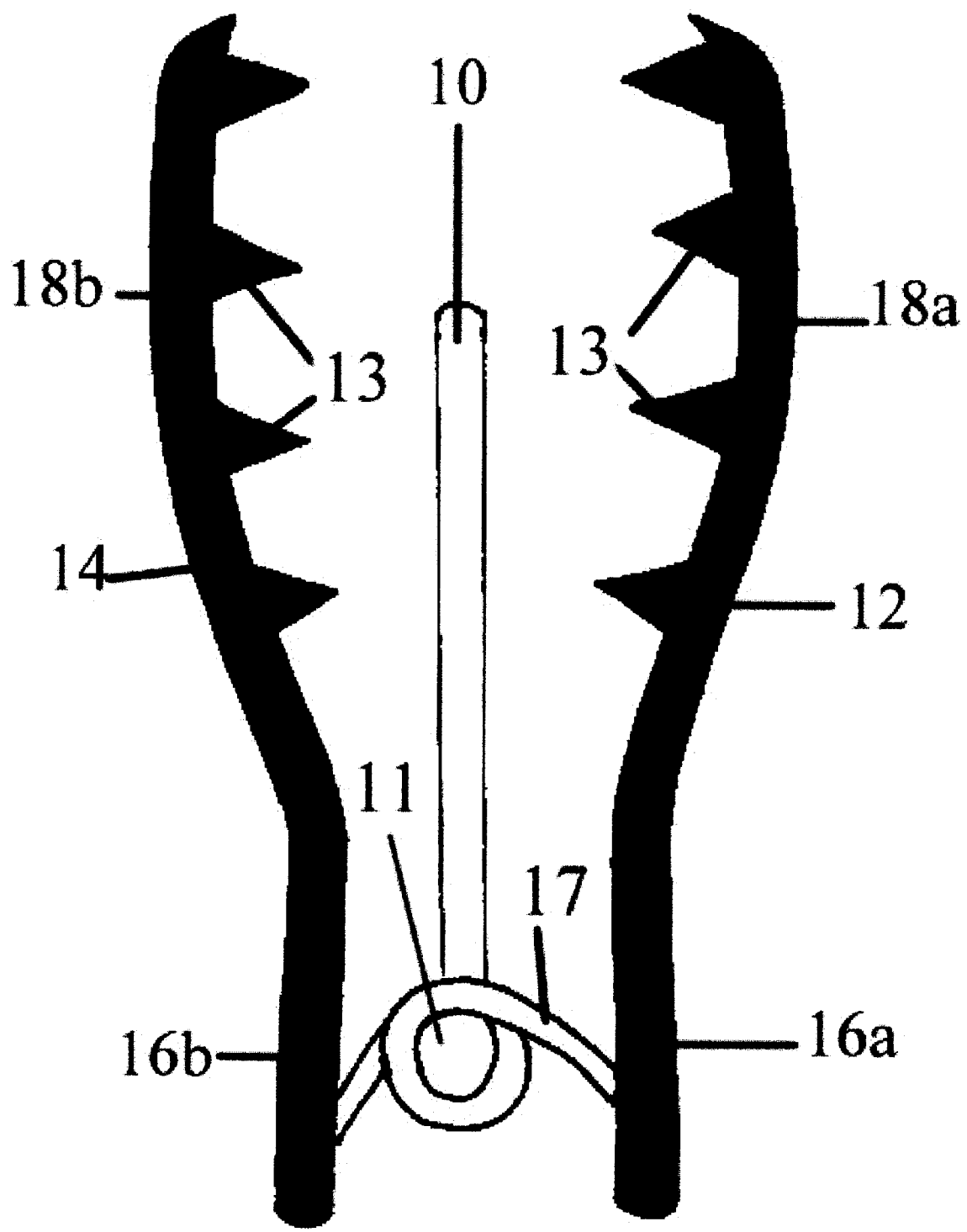
FIG. 1 is a side-plan view of the invention in a simple embodiment.

With reference now to the drawings, the preferred embodiment of the fish holder will be described herein. As noted in FIG. 1, the invention comprises two jaws 12, 14 mounted on a central "T" support. The "T" support can be said to have two parts, the tongue 10 and the axel 11. Jaws 12, 14 are biased in a closed position by spring 17, mounted on axel 11. The jaws may also be said to have two sections, a handle section 16a, 16b and an arced section 18a, 18b. A plurality of teeth 13 are positioned on the interior of the arced sections 18a, 18b of jaws 12, 14.

Figure 2:
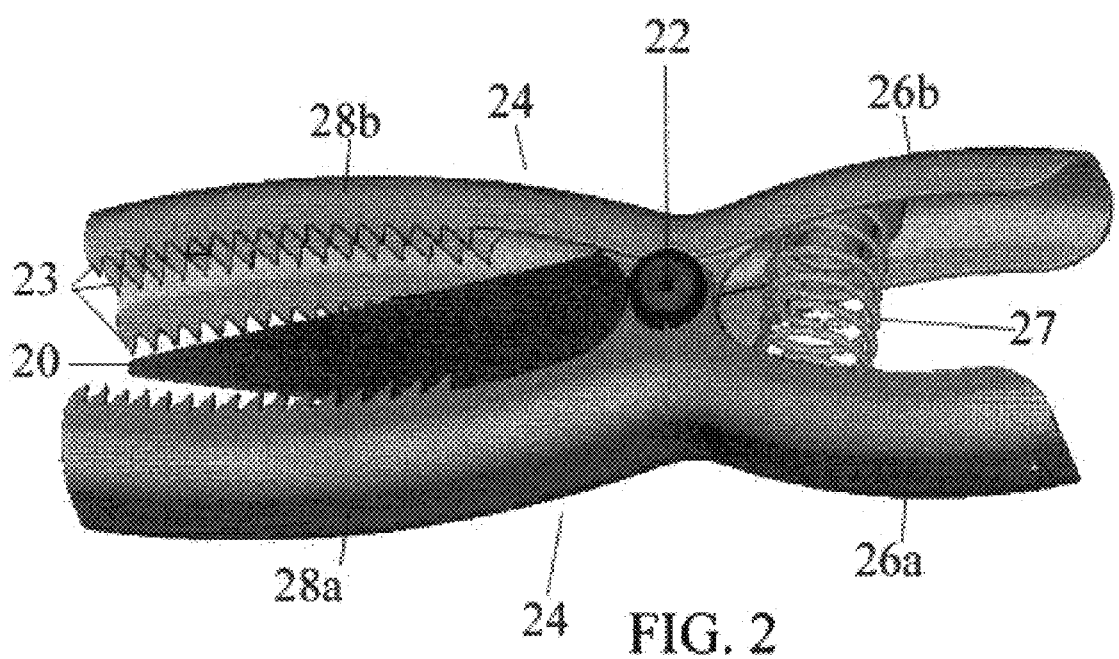
FIG. 2 is a perspective view of the invention in the preferred embodiment, with a wedged tongue and multiple rows of teeth along the jaws.

There are a number of alternative embodiments for the present invention. In the preferred embodiment, shown in FIG. 2, with individual parts shown in the later figures, the central "T" support is divided into two separate pieces, a broad tongue 20 and an axel 21. Jaws 24 each define a hemispheric interior, the edges of which are lined with a row of teeth 23. Jaws 24 are mounted on the axel 22 of the central "T" support. A single spring 27 is positioned between handles 28a and 28b so as to bias arced sections 26a and 26b in a closed position.

Figure 3:
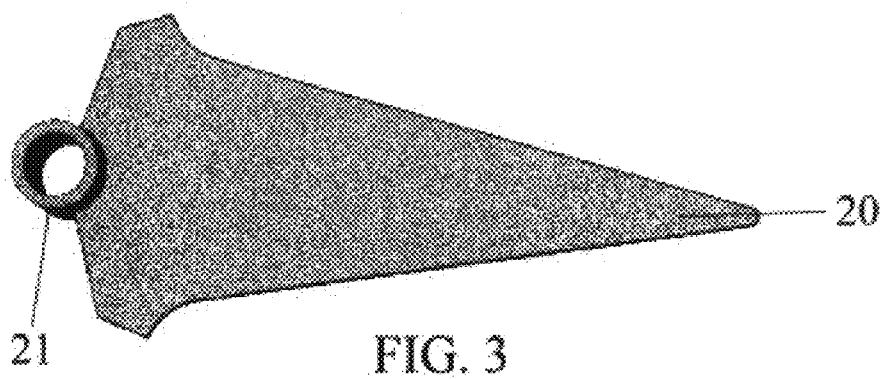
FIG. 3 is a front plan view of the tongue of the holder of FIG. 2.
Figure 4:
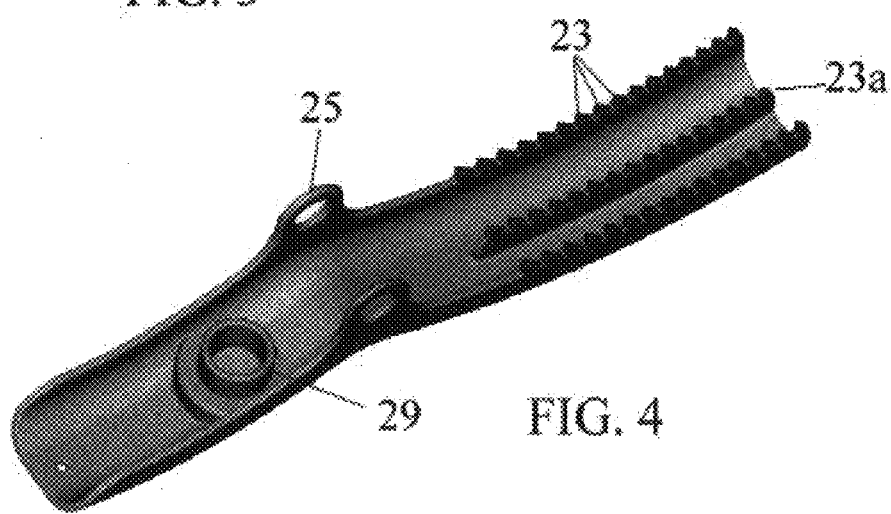
FIG. 4 is a perspective view of one jaw of the holder of FIG. 2.
Figure 5:
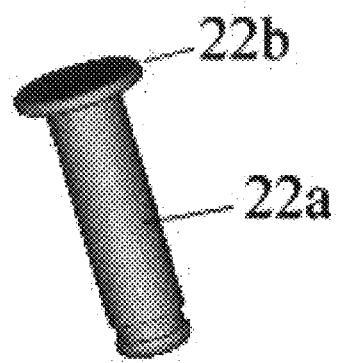
FIG. 5 is a perspective view of the axel of the holder of FIG. 2.
Figure 6:
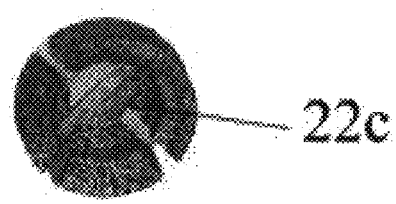
FIG. 6 is a plan view of the inside of the axel cap of the holder of FIG. 2.
Figure 7:
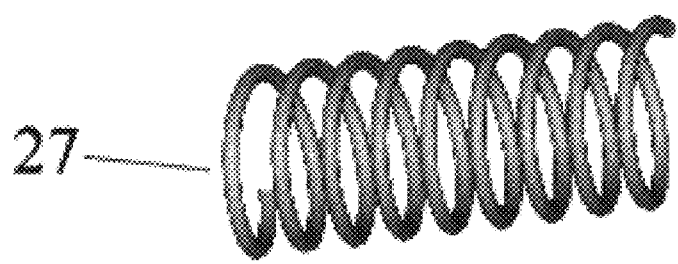
FIG. 7 is a perspective view of the spring of the holder of FIG. 2.

The preferred holder is assembled by inserting axel body 22a, shown in FIG. 5, through the mounting ears 25 on the jaws 24, shown in FIG. 4 and through mounting hole 21 in the tongue 20, shown in FIG. 3. The axel 22 is held in place by axel head 22b and axel cap 22c, shown in FIG. 6, which is applied to axel body 22a after it is inserted through the requisite parts. Spring 27 is held in place by two opposing spring mounts 25, one in each jaw 24, shown in FIG. 4. Spring 27 must be of sufficient length to fit within jaws 24, but simultaneously not slip off mounts 25. It must also have a requisite spring force constant to place enough compression force on the handles in order to actually hold a fish within the arced sections while simultaneously allowing for compression of the handles by a user.

As to the construction of jaws 24, teeth 23 line the entire length of the jaws' arced sections 28a and 28b. Their ideal placement is on the ridges formed by the hemispherical shape of the jaws. Additional rows of teeth may be added to the interior of the jaws 24. Shown in FIG. 4, jaw 24 has an additional row of teeth 23a, slightly offset from the center of the jaw. The jaws mounting ears 25 may be slightly offset to one direction, either both to the left or both to the right, to allow for easier assembly with two identical jaws. Alternatively, the ears 25 may be positioned on the jaws in such a manner to allow one jaw to have "external" ears and another "internal" ears so that they will nest after assembly. Arced sections 28a and 28b may be both convex, as shown in the figures, or one convex and the other concave, to allow better hold on fish with weaker jaws.

In use, a user compresses the handles 28a and 28b together, opening jaws 24. A fish's head is inserted between the arced sections 26a and 26b, with tongue 20 inserted within the mouth of the fish. The user then gently releases handles 28a and 28b and the jaws 24 close around the fish's head. Any users may then fillet, scale, skin, or whatever operation the user wishes to do to the fish in preparation for either storage or consumption. Assuming a filleting operation, the user cuts the fillets off of one side of the fish while grasping the handles 28a, 28b, then flips the holder, and thus the fish, in order to fillet the other side. When finished, the user simply holds the holder over a waste receptacle and squeezes handles 28a, 28b, to release the fish remains.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A fish holder comprising:

a central support;

at least one spring;

at least two jaws, each having an arced section and a handle section, each jaw having a length, said length defined as the dimension extending though the arced and handle sections; and a plurality of teeth lining an interior of the jaws' arced sections along the length of the fish holder;

wherein the jaws are mounted on the central support in a relation such that jaws pivot about the support and the at least one spring biases the jaws' arced sections together into a closed position, so that the holder may be used to grasp and secure a fish about its head.

2. The fish holder of claim 1, wherein the central support is "T" shaped, having two members, a long tongue and a short axel, with the jaws mounted on the axel of the support.

3. The fish holder of claim 2, wherein together the jaws encompass the tongue of the support in a coaxial relation, so that each jaw defines a hemispherical interior region and contacts the fish in two rows, each row therein lined with a plurality of teeth, and each jaw is joined to the axel by two mounting ears, one ear on either side of the tongue.

4. The fish folder of claim 3, wherein the jaws each have an additional third row of teeth.

5. The fish holder of claim 4, wherein the third row of teeth in each jaw is positioned slightly off center in relation to each jaw, such that the jaws' additional rows of teeth are not disposed directly opposite one another when the fish holder is assembled.

6. The fish holder of claim 5, wherein the two places where the ears of the jaws are offset in the same direction relation to the jaws so that the holder may be made of two identical jaws.

7. The fish holder of claim 5 wherein the ears of the jaws are manufactured so that one jaw's set of ears are disposed towards an outside of the jaw and the other jaw's set of ears are disposed towards an inside of the jaw so that one set of ears will nest within the other when the holder is assembled.

8. The fish holder of claim 4, wherein the two places where the ears of the jaws are offset in the same direction relation to the jaws so that the holder may be made of two identical jaws.

9. The fish holder of claim 4 wherein the ears of the jaws are manufactured so that one jaw's set of ears are disposed towards an outside of the jaw and the other jaw's set of ears are disposed towards an inside of the jaw so that one set of ears will nest within the other when the holder is assembled.

10. The fish holder of claim 3, wherein the two places where the ears of the jaws are offset in the same direction relation to the jaws so that the holder may be made of two identical jaws.

11. The fish holder of claim 3 wherein the ears of the jaws are manufactured so that one jaw's set of ears are disposed towards an outside of the jaw and the other jaw's set of ears are disposed towards an inside of the jaw so that one set of ears will nest within the other when the holder is assembled.

12. The fish holder of claim 1, wherein together the jaws encompass the tongue of the support in a coaxial relation, so that each jaw defines a hemispherical interior region and contacts the fish in two rows, each row therein lined with a plurality of teeth, and each jaw is joined to the axel by two mounting ears, one ear on either side of the tongue.

13. The fish folder of claim 12, wherein the jaws each have an additional third row of teeth.

14. The fish holder of claim 13, wherein the two places where the ears of the jaws are offset in the same direction relation to the jaws so that the holder may be made of two identical jaws.

15. The fish holder of claim 13 wherein the ears of the jaws are manufactured so that one jaw's set of ears are disposed towards an outside of the jaw and the other jaw's set of ears are disposed towards an inside of the jaw so that one set of ears will nest within the other when the holder is assembled.

16. The fish holder of claim 12, wherein the two places where the ears of the jaws are offset in the same direction relation to the jaws so that the holder may be made of two identical jaws.

17. The fish holder of claim 12 wherein the ears of the jaws are manufactured so that one jaw's set of ears are disposed towards an outside of the jaw and the other jaw's set of ears are disposed towards an inside of the jaw so that one set of ears will nest within the other when the holder is assembled.

18. A fish holder comprising:
   a central support, further comprising;
      a tongue component;
      an axel component, in a perpendicular relationship to the tongue; and
      an axel-securing component;
   at least one spring;
   at least two jaws, each having an arced section and a handle section, the arced sections of one having a convex orientation and the other having a concave orientation, such that the concave jaw nests within the convex jaw, each jaw having a length, said length defined as the dimension extending through the arced and handle sections; and
   a plurality of teeth lining an interior of the jaws' arced sections along the length of the fish holder;
   wherein the jaws are mounted on the central support in a relation such that jaws are mounted upon and pivot about the axel component and the at least one spring biases the jaws' arced sections together into a closed position, so that the holder may be used to grasp and secure a fish about its head.

19. A fish holder comprising:
   a central support, further comprising;
      a tongue component;
      an axel component, in a perpendicular relationship to the tongue; and
      an axel-securing component;
   at least one spring;
   at least two jaws, each having an arced section and a handle section, the arced sections of which both having a convex orientation, each jaw having a length, said length defined as the dimension extending through the arced and handle sections; and
   a plurality of teeth lining an interior of the jaws' arced sections along the length of the fish holder;
   wherein the jaws are mounted on the central support in a relation such that jaws are mounted upon and pivot about the axel component and the at least one spring biases the jaws' arced sections together into a closed position, so that the holder may be used to grasp and secure a fish about its head.

* * * * *